(12) United States Patent
Mathews et al.

(10) Patent No.: US 9,269,021 B2
(45) Date of Patent: Feb. 23, 2016

(54) IMAGE COMPARISON BASED ON CHECKSUMS

(75) Inventors: Robin Montague Mathews, Westford, MA (US); Tushar Saxena, Lexington, MA (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 1156 days.

(21) Appl. No.: 12/784,589

(22) Filed: May 21, 2010

(65) Prior Publication Data

US 2011/0289415 A1    Nov. 24, 2011

(51) Int. Cl.
G06F 3/048    (2013.01)
G06K 9/62    (2006.01)
G06F 3/14    (2006.01)
G06K 9/46    (2006.01)
H04N 21/8352    (2011.01)

(52) U.S. Cl.
CPC ............ G06K 9/6202 (2013.01); G06F 3/1415 (2013.01); G06K 9/4642 (2013.01); H04N 21/8352 (2013.01); *G09G 2370/022* (2013.01)

(58) Field of Classification Search
CPC .................................. G06F 3/16; G06F 3/0481
USPC ................... 707/687, 697, 698; 715/716, 764
See application file for complete search history.

(56) References Cited

U.S. PATENT DOCUMENTS

| | | | | |
|---|---|---|---|---|
| 5,982,363 A * | 11/1999 | Naiff | | 715/721 |
| 6,259,443 B1 * | 7/2001 | Williams, Jr. | | 715/741 |
| 8,019,003 B2 * | 9/2011 | Godwin | | 375/240.26 |
| 2006/0031854 A1 * | 2/2006 | Godwin | | 719/328 |
| 2009/0210817 A1 * | 8/2009 | Schmieder et al. | | 715/781 |
| 2010/0226441 A1 * | 9/2010 | Tung et al. | | 375/240.24 |

* cited by examiner

Primary Examiner — Rashawn Tillery (57) ABSTRACT

A method including dividing a first image into first sub-images; calculating a first checksum value for each of the first sub-images; dividing a second image into second sub-images; calculating a second checksum value for each of the second sub-images; comparing the first checksum values with the second checksum values; and determining whether one or more differences in checksum values exist between the first checksum values and the second checksum values and correspondingly whether one or more differences exist between the first sub-images and the second sub-images.

20 Claims, 11 Drawing Sheets

IMAGE COMPARISON BASED ON CHECKSUMS

BACKGROUND

The process of comparing images has a wide array of applications. For example, image comparison is useful to minimize the repainting of a screen (i.e., minimize the repainting of pixels on a display). There are numerous methods for comparing images. However, image comparison can be a resource intensive process.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, image comparison between images may include calculating checksums associated with the images and comparing these checksums to determine whether differences exist between the images. According to an exemplary implementation, an image may be divided into sub-images. The sub-images may include pixel data values (e.g., raw pixel data values). A checksum may be calculated for each sub-image. The checksums may be stored and used for subsequent comparison with another image. That is, the other image may be divided into sub-images, a checksum may be calculated for each sub-image, and checksums associated with the other image may be compared to the checksums associated with the image. It may be determined whether differences exist between the images based on differences between the checksums.

According to an exemplary embodiment, image comparison may be used to determine whether differences exist between graphical user interfaces (GUIs). For example, the GUIs may relate to television content, such as, television guides, weather information, sports information, games, digital video recording (DVR), pay-per-view, or the like. As described further below, a home network may include a server and one or more clients. The home network may be connected to a television content distribution network to receive television content. When a user navigates, via the client, through various GUIs, the server may efficiently update/provide the GUIs to the client based on the image comparison described herein. For example, the user may navigate from one GUI screen to another GUI screen. The server may provide the differences between the one GUI screen and the other GUI screen based on the image comparison.

Figure 1A:
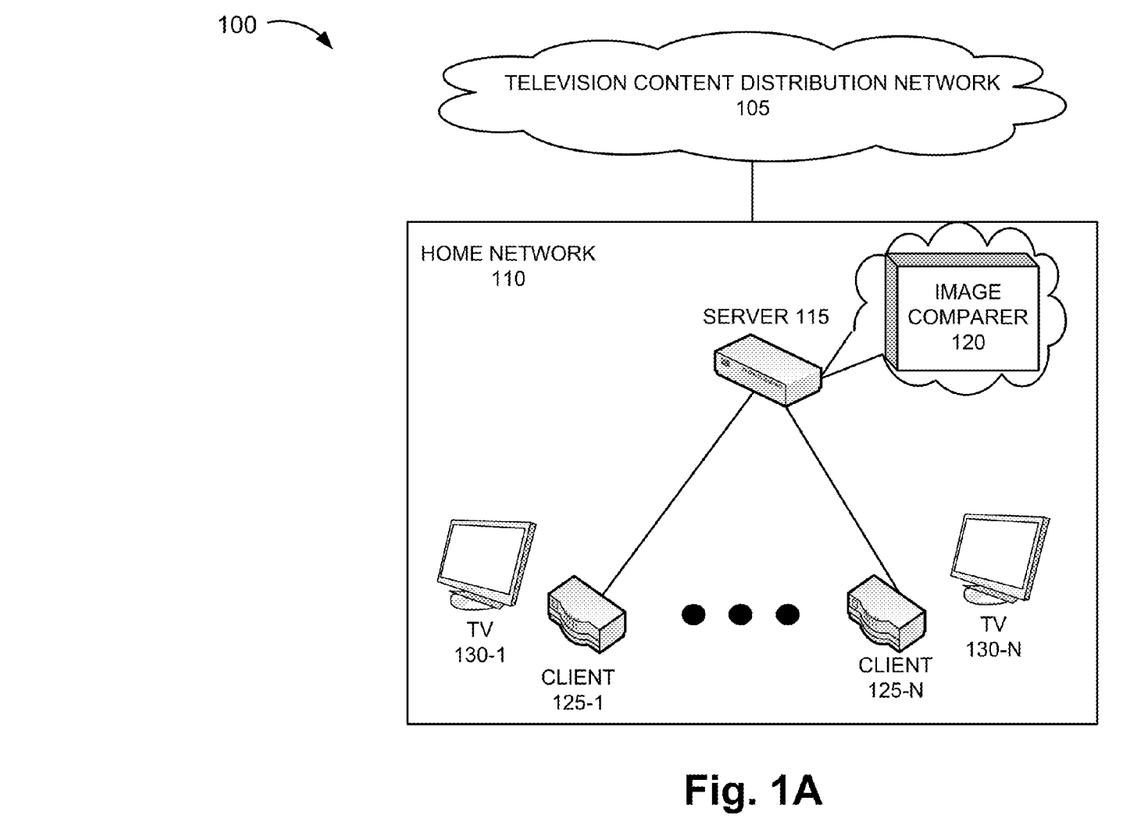
FIGS. 1A and 1B are diagrams illustrating an exemplary environment in which an exemplary embodiment for performing an image comparison based on checksums may be implemented.

FIG. 1A is a diagram illustrating an exemplary environment 100 in which an exemplary embodiment for performing image comparison based on checksums may be implemented. As illustrated in FIG. 1A, environment 100 may include a television content distribution network (TCDN) 115, and a home network 120 that includes a server 115 that includes an image comparer 120, clients 125-1 through 125-N (referred to generally as client 125 or clients 125), and televisions (TVs) 130-1 through 130-N (referred to generally as TVs 130 or TV 130).

The number of devices and configuration in environment 100 is exemplary and provided for simplicity. In practice, environment 100 may include more devices, different devices, and/or differently arranged devices, than those illustrated in FIG. 1A. Additionally, or alternatively, according to other implementations, topologies other than client/server may be used, such as, for example, peer-to-peer, standalone, etc. In this regard, image comparison based on checksums associated with images may be performed by a device other than a server, such as server 115. That is, image comparison may be performed on other types of computational and/or communicative devices (e.g., a user device (e.g., a desktop computer, etc.), a network device, etc.). Some functions described as being performed by a particular device may be performed by a different device or a combination of devices. Environment 100 may include wired and/or wireless connections among the devices illustrated.

TCDN 105 may include a network that distributes television content. For example, although not illustrated, TCDN 105 may include television serving offices, television distribution sites, data centers, etc.

Home network 110 may include a customer site that receives content (e.g., television content) from TCDN 105. As illustrated, home network 110 may include exemplary customer premise equipment, such as, for example, server 115 that includes image comparer 120, clients 125, and TVs 130.

Server 115 may include a device that provides services and/or other types of assets. According to an exemplary embodiment, server 115 may provide images to clients 115. By way of example, the images may correspond to GUIs. For example, the GUIs may correspond to television-related content, such as, television guides, weather information, sports information, games, digital video recording (DVR) information, pay-per-view, or the like. According to an exemplary implementation, server 115 may store the television-related GUIs and provide GUIs to client 125 upon request (e.g., from a user, not illustrated). Server 115 may also provide television content (e.g., television programming, pay-per-view, video-on-demand, etc.) to client 125. As described further below, server 115 may include image comparer 120. Image comparer 120 may compare images based on checksums associated with the images.

Client 125 may include a device that communicates with server 115 to obtain services and/or other types of assets. According to an exemplary embodiment, client 125 may communicate with server 115 to obtain images from server 115. By way of example, but not limited thereto, the images may correspond to GUIs. For example, the GUIs may correspond to television-related content, such as, television guides, weather information, sports information, games, DVR, or the like. Client 125 may correspond to a thin client. For example, client 125 may not include a hard drive and/or rely on server 115 to perform various processes. According to other implementations, client 125 may not correspond to a thin client. According to yet another implementation, client 125 may correspond to a set top box.

TV 130 may include a device to display content (e.g., television content). TV 130 may correspond to a television or any other type of monitor/display. According to an exemplary implementation, TV 130 may include client 125. According to other exemplary implementations, TV 130 and client 125 may be separate devices, as illustrated in FIG. 1A.

Figure 1B:
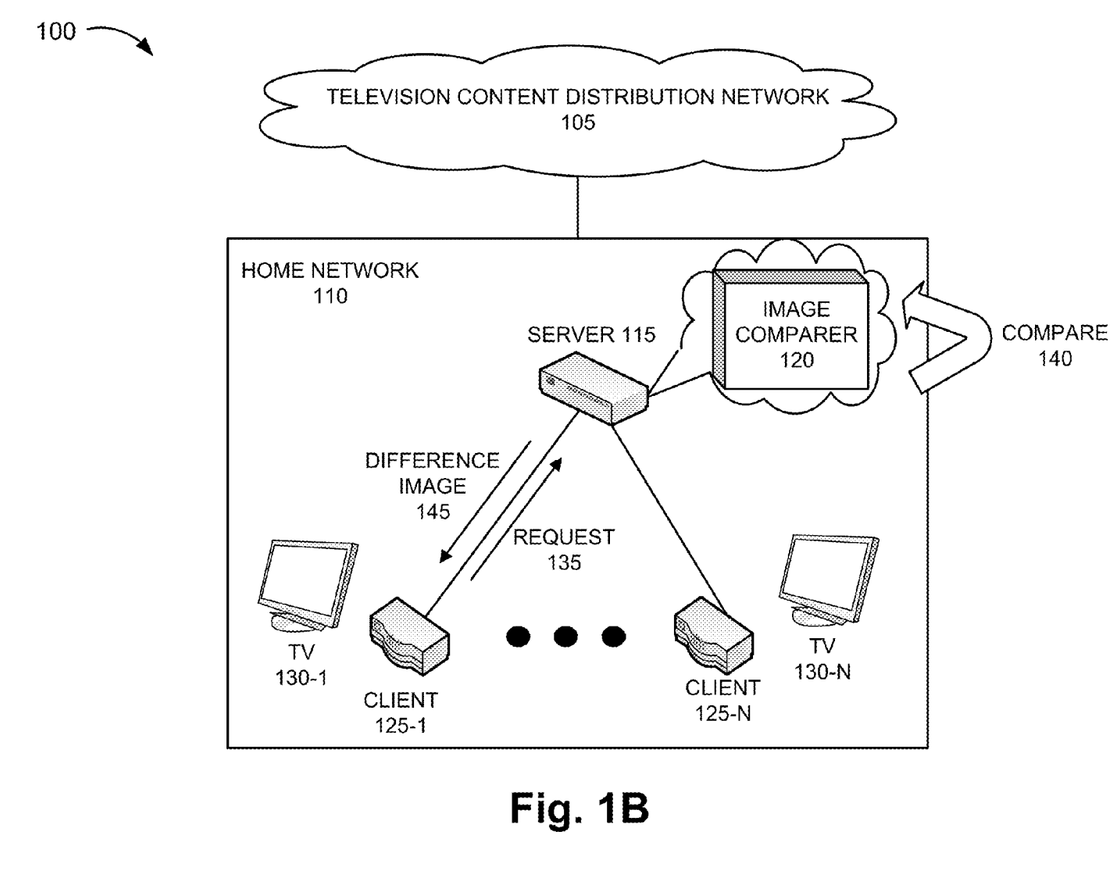

Referring to FIG. 1B, according to an exemplary process, client 125-1 may send a request 135 for a GUI based on a user interaction with client 125-1. Image comparer 120 of server 115 may receive request 135 and compare 140 checksums associated with a current GUI to checksums associated with a requested GUI. According to an exemplary implementation, when a difference of checksums exists between sub-images associated with the current GUI and the requested GUI, server 115 may send a difference image 145 associated with the difference checksum.

As a result of the foregoing, server 115 may avoid utilizing extensive resources that may customarily occur when having to perform hundreds or thousands of op-code executions (i.e., execution of instructions) when performing a memory comparison between images. Rather, server 115 may significantly reduce resource utilization by comparing the checksums associated with the images. In this way, server 115 may efficiently refresh GUIs (e.g., television-related GUIs) at client 125. Since an exemplary embodiment has been broadly described, a more detailed description is provided below, along with various implementations.

Figure 2:
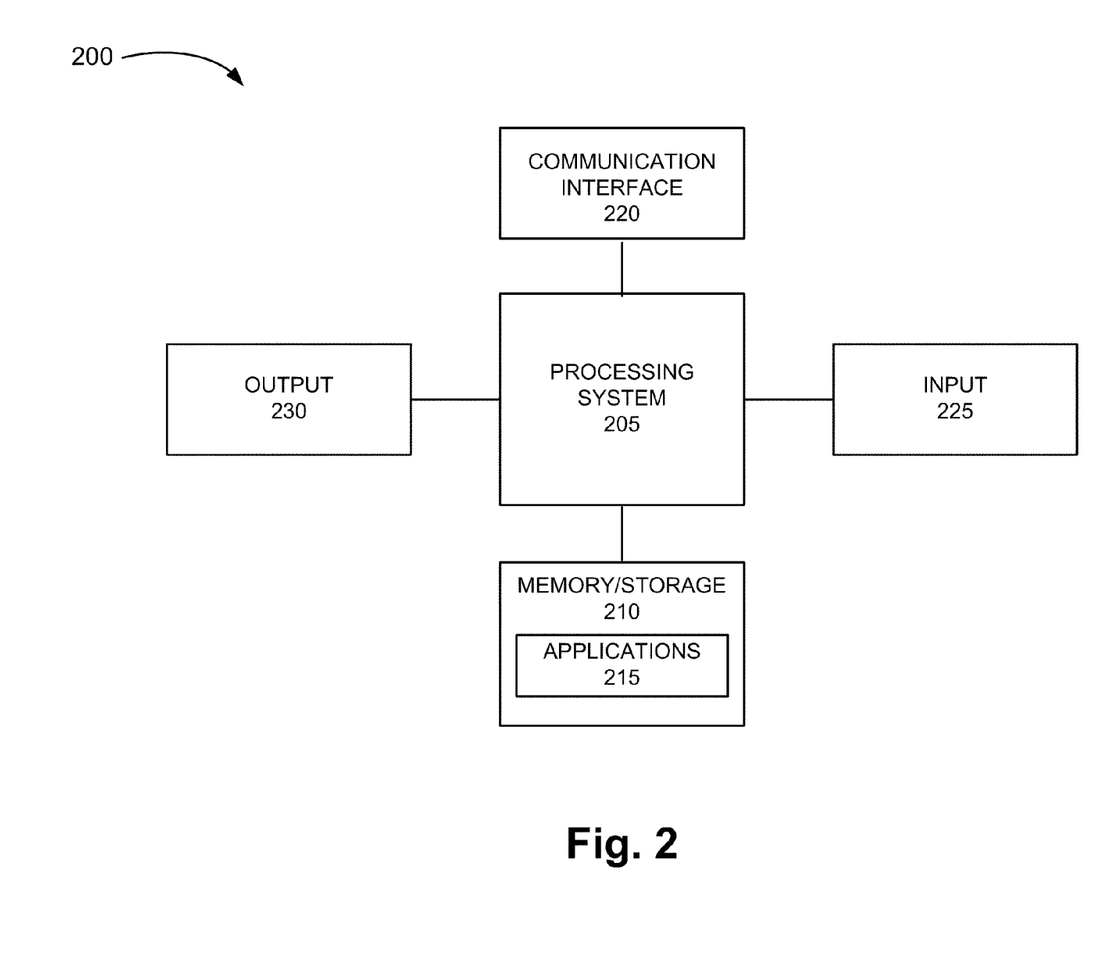
FIG. 2 is a diagram illustrating exemplary components of a device that may correspond to one or more of the devices in the environment depicted in FIGS. 1A and 1B.

FIG. 2 is a diagram illustrating exemplary components of a device 200 that may correspond to one or more of the devices in environment 100. For example, device 200 may correspond to server 115 and/or client 125. As illustrated, device 200 may include a processing system 205, memory/storage 210 including applications 215, a communication interface 220, an input 225, and an output 230. According to other implementations, device 200 may include fewer components, additional components, different components, and/or a different arrangement of components than those illustrated in FIG. 2 and described herein.

Processing system 205 may include one or multiple processors, microprocessors, data processors, co-processors, application specific integrated circuits (ASICs), controllers, programmable logic devices, chipsets, field programmable gate arrays (FPGAs), application specific instruction-set processors (ASIPs), system-on-chips (SOCs), and/or some other component that may interpret and/or execute instructions and/or data. Processing system 205 may control the overall operation or a portion of operation(s) performed by device 200. Processing system 205 may perform one or more operations based on an operating system and/or various applications (e.g., applications 215).

Processing system 205 may access instructions from memory/storage 210, from other components of device 200, and/or from a source external to device 200 (e.g., a network or another device).

Memory/storage 210 may comprise one or multiple memories and/or one or multiple secondary storages. For example, memory/storage 210 may comprise a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory and/or a secondary storage that is external to and/or removable from device 200, such as, for example, a Universal Serial Bus (USB) memory stick, a dongle, a hard disk, mass storage, off-line storage, etc.

The term "computer-readable medium," as used herein, is intended to be broadly interpreted to comprise, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Memory/storage 210 may store data, applications 215, and/or instructions related to the operation of device 200. For example, with reference to server 115, applications 215 may include one or multiple applications for dividing an image, calculating checksums, comparing checksums, and/or identifying differences between checksums, etc., which may be processes performed by image comparer 120, as described further below.

Communication interface 220 may permit device 200 to communicate with other devices, networks, and/or systems, or the like. Communication interface 220 may include a wireless interface and/or a wired interface. Communication interface 220 may include a transmitter, a receiver, and/or a transceiver. Communication interface 220 may operate according to various protocols, standards, and the like.

Input 225 may permit an input into device 200. For example, input 225 may include a keyboard, a mouse, a microphone, a display, a touchpad, a button, a switch, an input port, voice recognition logic, fingerprint recognition logic, a web cam, and/or some other type of visual, auditory, tactile, etc., input component.

Output 230 may permit an output from device 200. For example, output 230 may include a speaker, a display, one or more light emitting diodes (LEDs), an output port, and/or some other type of visual, auditory, tactile, etc., output component.

As described herein, device 200 may perform processes in response to processing system 205 executing software instructions (e.g., applications 215) contained in a computer-readable medium, such as memory/storage 210. By way of example, but not limited thereto, the software instructions may be read into memory/storage 210 from another computer-readable medium or from another device via communication interface 220. The software instructions stored in memory/storage 210 may cause processing system 205 to perform processes described herein. Alternatively, device 200 may perform processes based on hardware (processing system 205, etc.), hardware and firmware, and/or hardware, software, and firmware.

As previously described, according to an exemplary embodiment, image comparer 120 may compare images based on checksums associated with the images. FIGS. 3A-3F are diagrams illustrating exemplary processes associated with comparing images based on checksums. Image comparer 120 may be implemented in hardware (e.g., processing system 205, etc.), hardware and software (e.g., applications 215), or hardware, software, and firmware based on the components illustrated and described with respect to FIG. 2. According to an exemplary implementation, image comparer 120 may include a dedicated checksum calculator (e.g., implemented in hardware, hardware and software, etc.) to minimize resource utilization associated with processing system 205. According to other implementations, the checksum calculator may not be a dedicated component.

Figure 3A:
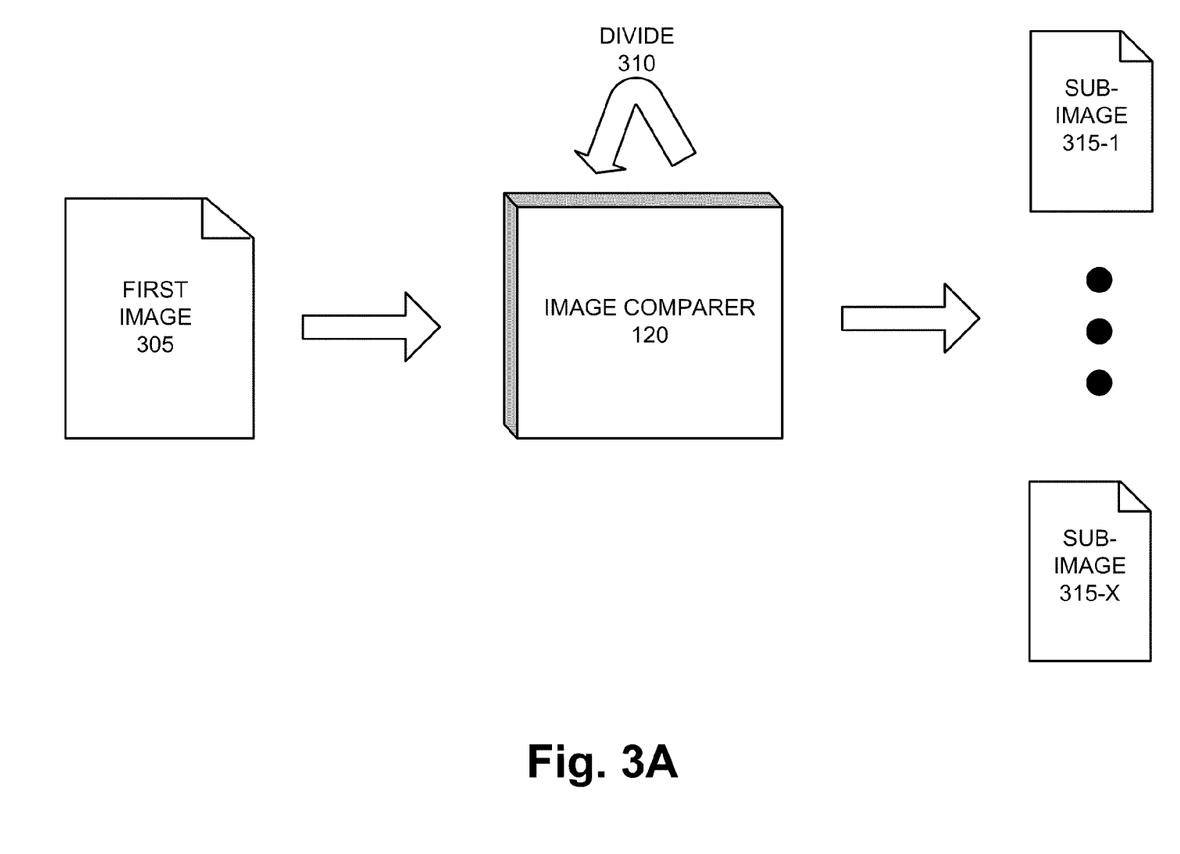
FIGS. 3A-3F are diagrams illustrating exemplary processes associated with comparing images based on checksums.

Referring to FIG. 3A, according to an exemplary implementation, image comparer 120 may divide 310 a first image 305 into sub-images 315-1 through 315-X (referred to generally as sub-image 315 or sub-images 315) (e.g., X>1). For example, first image 305 may correspond to a bitmap image. Sub-images 315 may include, for example, raw pixel data values.

Figure 3B:
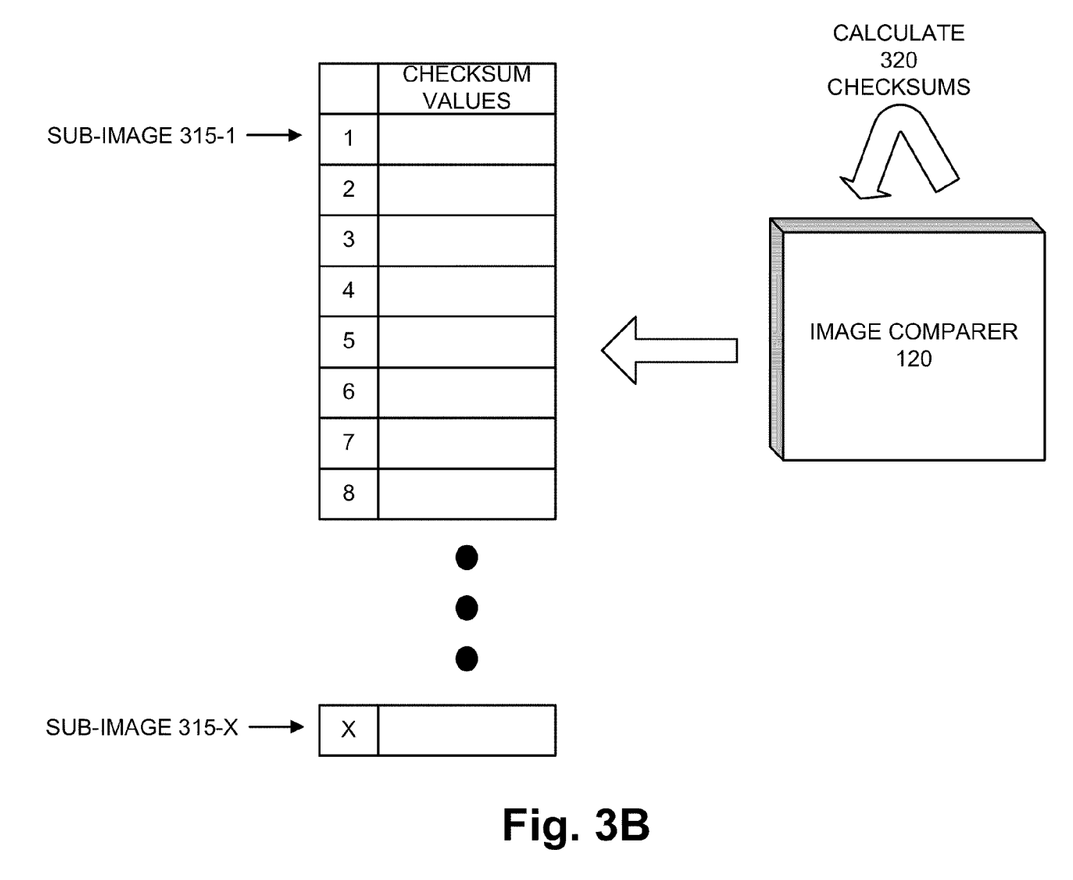

Referring to FIG. 3B, according to an exemplary implementation, image comparer 120 may calculate 320 a checksum value associated with each of sub-images 315. Image comparer 120 may store these checksum values in a data structure (e.g., a list, etc.).

Figure 3C:
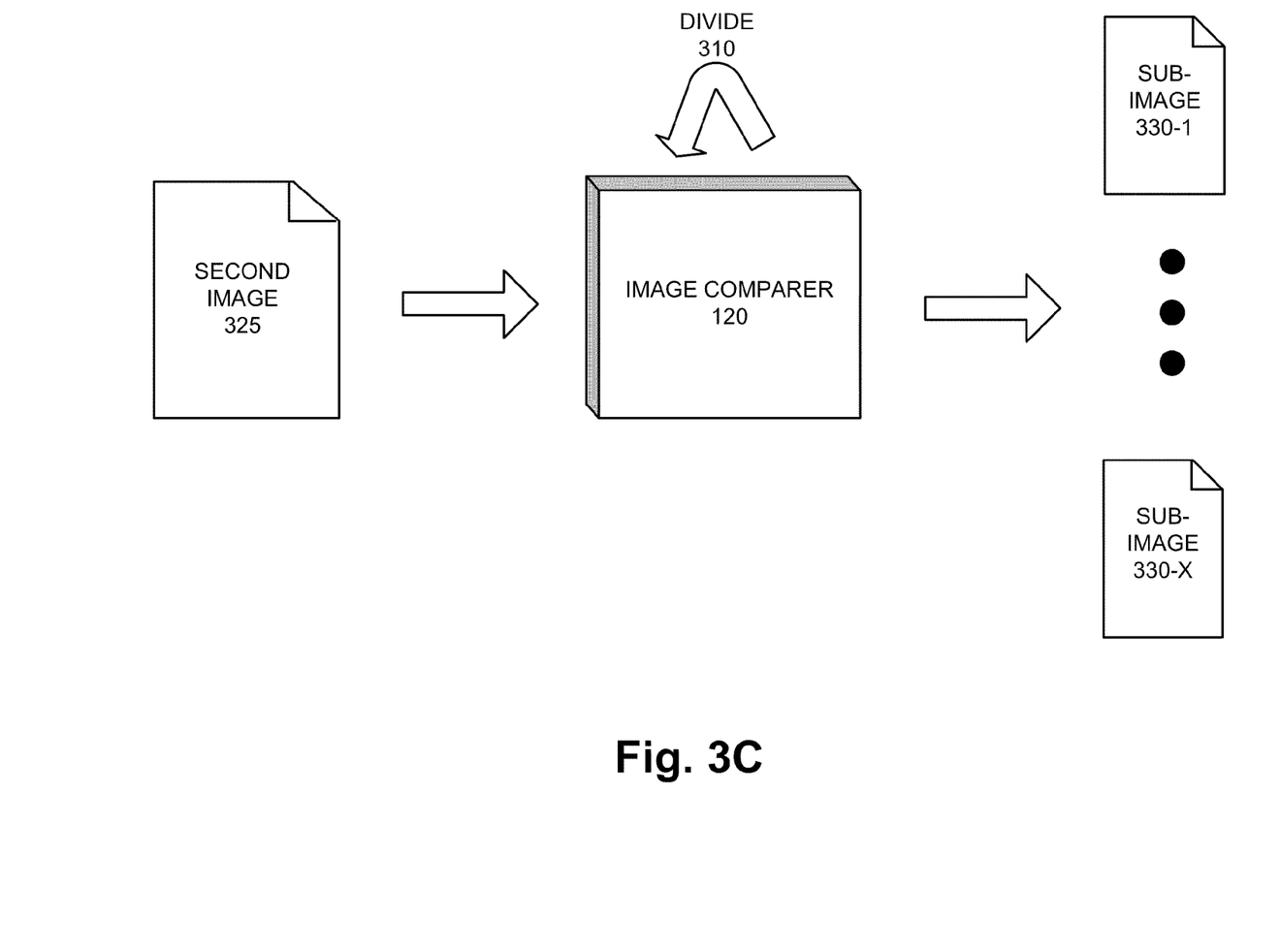

Referring to FIG. 3C, according to an exemplary implementation, image comparer 120 may divide 310 a second image 325 into sub-images 330-1 through 330-X (referred to generally as sub-image 330 or sub-images 330) (e.g., X>1). For example, second image 325 may correspond to a bitmap image. Sub-images 330 may include, for example, raw pixel data values. Second image 325 may correspond to, for example, an updated and/or a requested image.

Figure 3D:
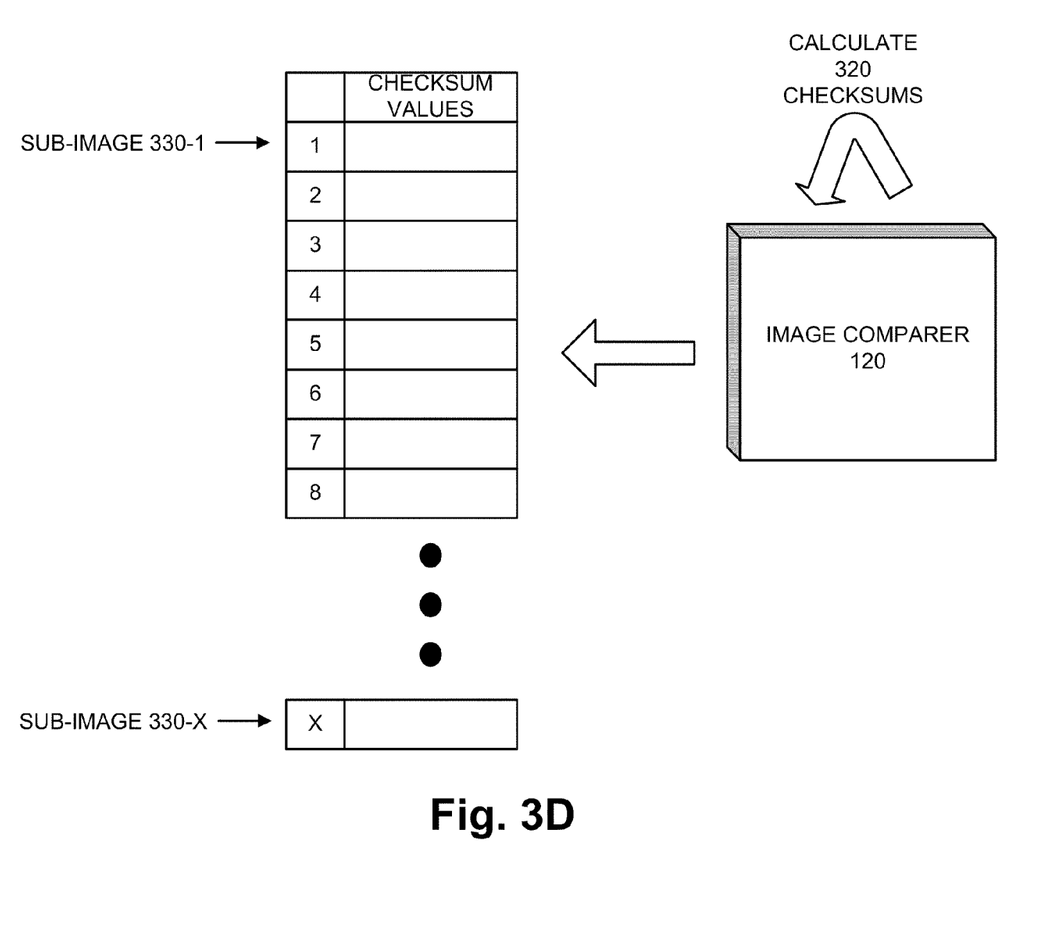

Referring to FIG. 3D, according to an exemplary implementation, image comparer 120 may calculate 320 checksums associated with each of sub-images 330. Image comparer 120 may store these checksums values in a data structure (e.g., a list, etc.).

Figure 3E:
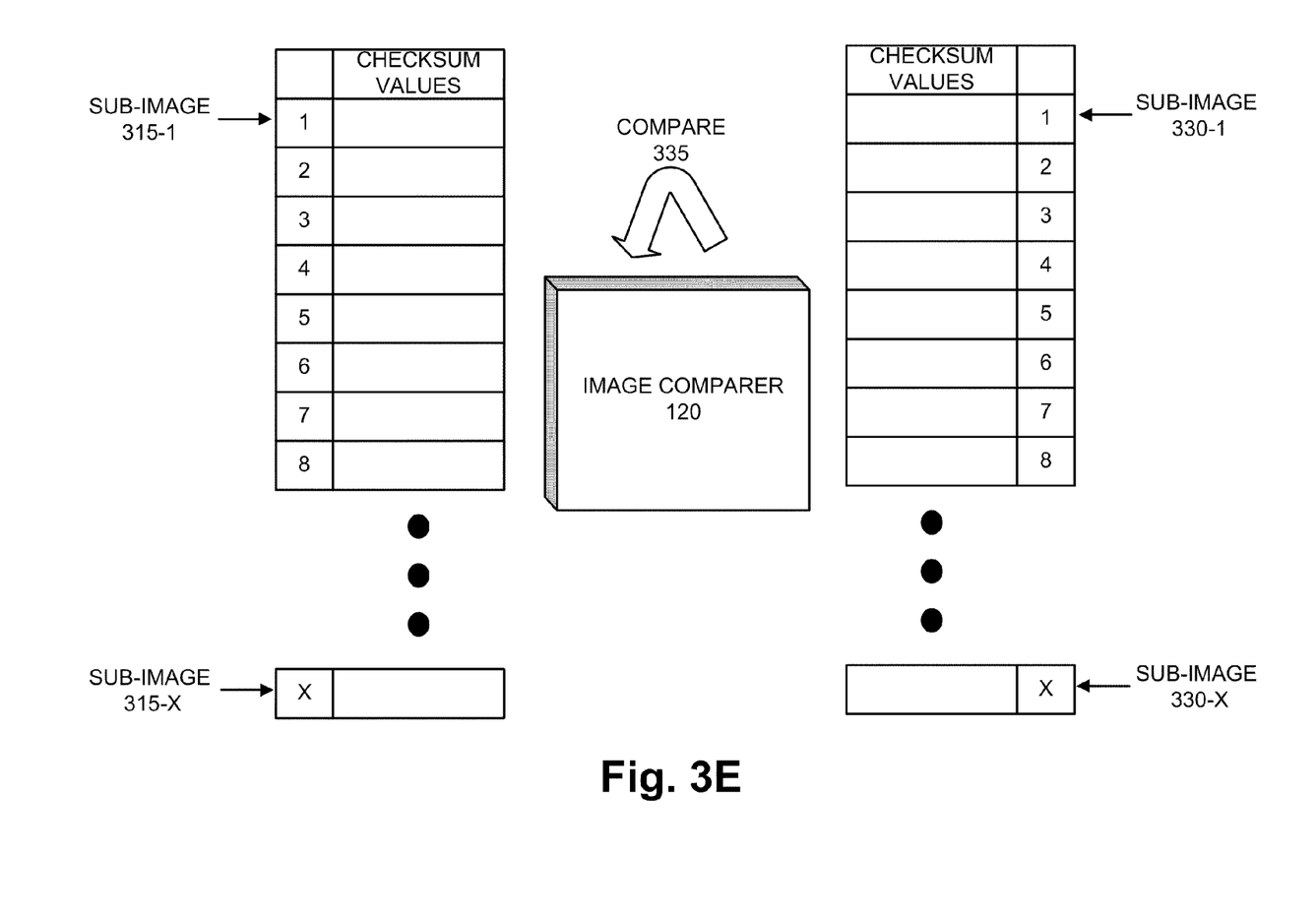

Referring to FIG. 3E, according to an exemplary implementation, image comparer 120 may compare 335 the checksum values associated with sub-images 315 to the checksum values associated with sub-images 330. Based on the comparison, image comparer 120 may identify differences in checksum values and corresponding sub-images.

Figure 3F:
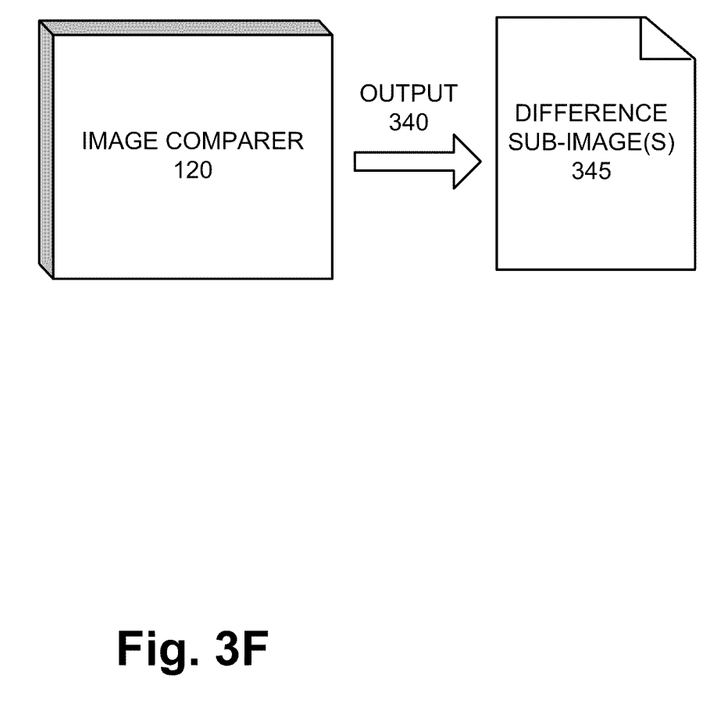

Referring to FIG. 3F, according to an exemplary implementation, image comparer 120 may output 340 difference sub-image(s) 345 when checksum value(s) associated with sub-images 315 differ from checksum value(s) associated with sub-images 330. For example, server 115 may provide client 125 with difference sub-image(s) 345. Difference sub-image(s) 345 may correspond to sub-image(s) 330 associated with second image 325 that differ from sub-image(s) 315 associated with first image 305. In the event that there are no differences (i.e., in checksum values), image comparer 120 may output an indication that there are no differences.

Figure 4A:
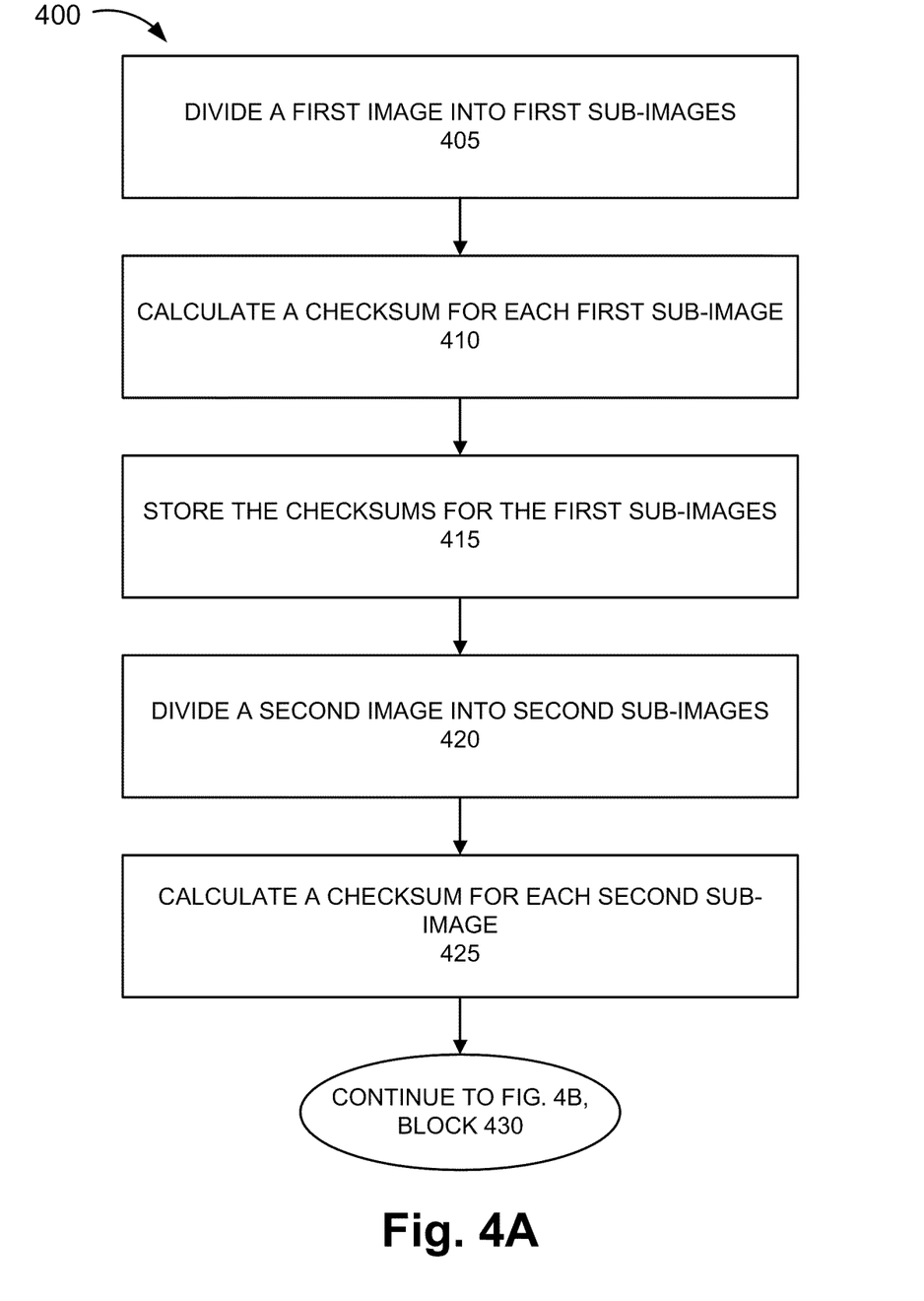
FIGS. 4A-4B are flow diagrams illustrating an exemplary process for comparing images based on checksums associated with the images.
Figure 4B:
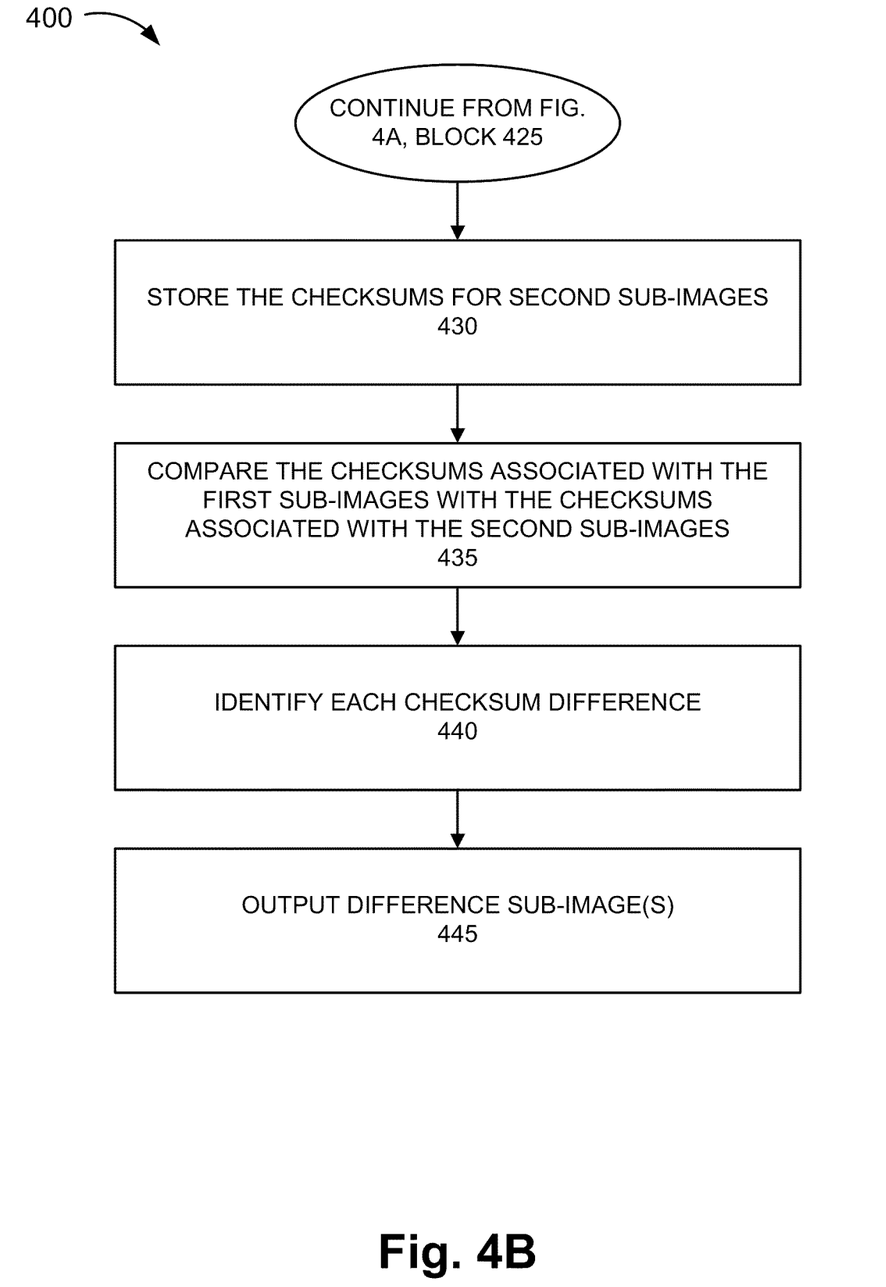

FIGS. 4A-4B are flow diagrams illustrating an exemplary process 400 for comparing images based on checksums associated with the images. According to an exemplary implementation, process 400 may be performed by image comparer 120 of server 115. According to other implementations, image comparer 120 may be implemented within a device other than a server, as previously described. According to an exemplary embodiment, the images may correspond to television-related GUIs.

Process 400 may include dividing a first image into multiple first sub-images (block 405). For example, as previously described, image comparer 120 may divide a first image into X number of first sub-images (e.g., X>1).

A checksum for each first sub-image may be calculated (block 410). For example, as previously described, image comparer 120 may calculate a checksum value for each of the first sub-images.

The checksums for the first sub-images may be stored (block 415). For example, as previously described, image comparer 120 may store the checksums associated with the first sub-images in a data structure (e.g., a list, etc.).

A second image may be divided into second sub-images (block 420). For example, as previously described, image comparer 120 may divide a second image into X number of second sub-images (e.g., X>1).

A checksum for each second sub-image may be calculated (block 425). For example, as previously described, image comparer 120 may calculate a checksum value for each of the second sub-images.

Referring to FIG. 4B, the checksums for the second sub-images may be stored (block 430). For example, as previously described, image comparer 120 may store the checksums associated with the second sub-images in a data structure (e.g., a list, etc.).

The checksums associated with the first sub-images may be compared with the checksums associated with the second sub-images (block 435). For example, as previously described, image comparer 120 may compare the checksum values associated with the first sub-images with the checksum values associated with the second sub-images. Each checksum difference between the first sub-images and the second sub-images may be identified (block 440). For example, as previously described, image comparer 120 may determine whether any differences between the first sub-images and the second sub-images exist based on any differences between the checksum values.

The difference sub-image(s) may be output (445). For example, when image comparer 120 identifies differences between the checksum values, image comparer 120 may output the difference sub-image(s) associated with the checksum value(s). For example, according to the exemplary scenario described above with respect to FIGS. 1A-1B, server 115 may provide client 125 with the difference sub-images associated with the second sub-images.

Although FIGS. 4A-4B illustrate an exemplary process 400 for comparing images based on checksums associated with the images, in other implementations, process 400 may include additional operations, fewer operations, and/or different operations than those illustrated in FIGS. 4A-4B and described herein.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 4A-4B, the order of the blocks may be modified in other implementations. Further, non-dependent blocks may be performed in parallel. Additionally, other processes described in this description may be modified and/or non-dependent operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware (e.g., processing system 205, etc.), a combination of hardware and software (e.g., applications 215), a combination of hardware and firmware, or a combination of hardware, firmware, and software.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:
   providing, by an in-home device, television programming to a set top box;
   transmitting, by the set top box, a request for a television-related graphical user interface, wherein the television-related graphical user interface pertains to one of a television guide, digital video recording information, or pay-per-view information;
   receiving, by the in-home device, the request;
   transmitting, by the in-home device, a first image pertaining to the television-related graphical user interface;
   transmitting, by the set top box, another request for another television-related graphical user interface;
   receiving, by the in-home device, the other request for another television-related graphical user interface;
   dividing, by the in-home device, the first image into first sub-images;
   calculating, by the in-home device, a first checksum value for each of the first sub-images;
   storing, by the in-home device, the first checksum values of the first sub-images;
   dividing, by the in-home device, a second image into second sub-images, wherein the second image is the other television-related graphical user interface;
   calculating, by the in-home device, a second checksum value for each of the second sub-images;
   storing, by the in-home device, the second checksum values of the second image;
   comparing, by the in-home device, the first checksum values with the second checksum values;
   determining, by the in-home device, whether one or more differences in checksum values exist between the first checksum values and the second checksum values and correspondingly whether one or more differences exist between the first sub-images and the second sub-images; and
   outputting, by the in-home device, an indication that there are no differences between the first image and the second image, in response to a determination that there are no differences between the first checksum values and the second checksum values.

2. The method of claim 1, further comprising:
   transmitting one or more second sub-images that differ from corresponding one or more first sub-images in response to a determination that one or more differences exist between one or more first checksum values and one or more second checksum values.

3. The method of claim 1, further comprising:
   storing, by the in-home device, television-related graphical user interfaces.

4. The method of claim 1, further comprising:
   displaying the first image on a television; and
   displaying the second image on the television.

5. The method of claim 1, wherein the first image and the second image are divided into an equal number of first sub-images and second sub-images.

6. The method of claim 1, wherein the first image and the second image each include pixel data values.

7. The method of claim 1, wherein the first image and the second image correspond to bitmap images.

8. The method of claim 1, wherein the first sub-images include raw pixel data values.

9. An in-home server device comprising:
   a communication interface;
   a memory to store instructions;
   a processor to execute the instructions to:
      receive, via the communication interface, television content from a television content distribution network;
      transmit, via the communication interface, one or more television programs to a set top box included in a home network, in response to one or more requests from the set top box;
      receive from the set top box, via the communication interface, a request for a television-related graphical user interface, wherein the television-related graphical user interface pertains to one of a television guide, digital video recording information, or pay-per-view information;
      transmit to the set top box, via the communication interface, in response to the request, a first user interface pertaining to the television-related graphical user interface;
      receive from the set top box, via the communication interface, another request for another television-related graphical user interface;
      divide the first user interface into first sub-images;
      calculate a first checksum value for each of the first sub-images;
      store the first checksum values of the first sub-images;
      divide a second user interface into second sub-images, wherein the second user interface corresponds to the other television-related graphical user interface;
      calculate a second checksum value for each of the second sub-images;
      store the second checksum values of the second sub-images;
      compare the first checksum values with the second checksum values;
      determine whether one or more differences in checksum values exist between the first checksum values and the second checksum values and correspondingly whether one or more differences exist between the first sub-images and the second sub-images; and
      output an indication that there are no differences between the first image and the second image, in response to a determination that there are no differences between the first checksum values and the second checksum values.

10. The in-home server device of claim 9, wherein the first checksum values and the second checksum values are stored in a data structure.

11. The in-home server device of claim 9, wherein the processor further executes the instructions to:
  transmit to the set top box, via the communication interface, one or more second sub-images that differ from corresponding one or more first sub-images in response to a determination that one or more differences exist between one or more first checksum values and one or more second checksum values.

12. The in-home server device of claim 9, wherein, when dividing the first user interface and the second user interface, the processor further executes instructions to:
  divide the first user interface and the second user interface into an equal number of first sub-images and second sub-images.

13. The in-home server device of claim 9, wherein the first user interface and the second user interface correspond to bitmap images.

14. The in-home server device of claim 9, wherein the set top box corresponds to a thin client and the in-home server device stores television-related graphical user interfaces.

15. The in-home server device of claim 9, wherein the processor comprises:
  a dedicated checksum calculator.

16. A non-transitory computer-readable medium containing instructions executable by at least one processing system, the non-transitory computer-readable medium storing instructions to:
  receive television content from a television content distribution network;
  transmit one or more television programs in response to one or more requests;
  receive a request for a television-related graphical user interface, wherein the television-related graphical user interface pertains to one of a television guide, digital video recording information, or pay-per-view information;
  transmit, in response to the request, a first user interface pertaining to the television-related graphical user interface;
  receive another request for another television-related graphical user interface;
  divide the first user interface image into first sub-images;
  calculate a first checksum value for each of the first sub-images;
  store the first checksum values of the first sub-images;
  divide a second user interface image into second sub-images, wherein the second user interface corresponds to the other television-related graphical user interface;
  calculate a second checksum value for each of the second sub-images;
  store the second checksum values of the second sub-images;
  compare the first checksum values with the second checksum values;
  determine whether one or more differences in checksum values exist between the first checksum values and the second checksum values and correspondingly whether one or more differences exist between the first sub-images and the second sub-images; and
  output an indication that there are no differences between the first image and the second image, in response to a determination that there are no differences between the first checksum values and the second checksum values.

17. The non-transitory computer-readable medium of claim 16, further storing one or more instructions to:
  transmit one or more second sub-images that differ from corresponding one or more first sub-images in response to a determination that one or more differences exist between one or more first checksum values and one or more second checksum values.

18. The non-transitory computer-readable medium of claim 16, further storing one or more instructions to:
  divide the first user interface and the second user interface into an equal number of first sub-images and second sub-images.

19. The non-transitory computer-readable medium of claim 16, wherein the first user interface image and the second user interface image correspond to bitmap images.

20. The non-transitory computer-readable medium of claim 16, further storing instructions to:
  store television-related graphical user interfaces.

* * * * *